United States Patent [19]
Jablonsky

[11] 3,824,905
[45] July 23, 1974

[54] STEERING MECHANISM

[75] Inventor: Erich Jablonsky, Schwabisch Gmund, Germany

[73] Assignee: Zahnradfabrik Friedrichshafen AG, Friedrichshafen, Germany

[22] Filed: Apr. 11, 1972

[21] Appl. No.: 242,920

[30] Foreign Application Priority Data
Apr. 19, 1971 Germany............................ 2118813

[52] U.S. Cl..................... 92/136, 92/165, 74/89.15, 74/625
[51] Int. Cl. ..... F01b 9/00, F16h 29/02, F16h 29/20
[58] Field of Search.... 74/89.15, 625, 459, 424.8 R; 91/391, 380; 92/136, 165, 166

[56] References Cited
UNITED STATES PATENTS

| | | | |
|---|---|---|---|
| 679,421 | 7/1901 | Halsey............................ | 91/391 R |
| 1,108,443 | 8/1914 | Janney................................. | 91/380 |
| 1,423,817 | 7/1922 | Pitz et al........................... | 74/89.15 |
| 2,496,369 | 2/1950 | Baghuis.............................. | 91/388 |
| 2,743,706 | 5/1956 | Veenschoten..................... | 91/391 R |
| 2,983,159 | 5/1961 | Zeligowsky et al................ | 74/89.15 |
| 3,065,704 | 11/1962 | Hill...................................... | 92/166 |

*Primary Examiner*—Paul E. Maslousky

[57] ABSTRACT

A mechanism for actuating vehicle steering rods is provided having gearing intermediate the steering spindle and a nut operated rod actuator in order to increase mechanical advantage, particularly for heavy vehicles. Thus, in the event of pressure power failure used in booster steering, manual operation is readily usable without the usual extremely heavy physical force necessary with conventional mechanisms. Further, the invention used with or without power steering overcomes a drawback of prior art so-called rack steering arrangements. Thus, the gearing required for actuating steering rod mechanisms becomes increasingly larger where used for larger vehicles due to the increased steering forces required. This results in a loss of mechanical advantage at the steering wheel with conventional mechanisms, a condition precluded by the present invention which substitutes a rod actuator driven via bevel gears having a ratio affording a mechanical advantage.

5 Claims, 5 Drawing Figures

STEERING MECHANISM

Briefly the invention is an improvement in rack steering mechanisms in that an actuator rod which actuates the steering rods is reciprocated via a rotary nut, a mechanical feature known in itself, but wherein the nut is rotated through gearing which provides a mechanical advantage of any desired extent depending on the gearing ratio. The actuator rod has linear movement only and reciprocates in a housing which also has chambers that hold and support the gearing and nut. The construction is extremely simple and rigged and inherently adaptable for modification as will be apparent.

A detailed description of the invention now follows in conjunction with the appended drawing in which.

Figure 1:
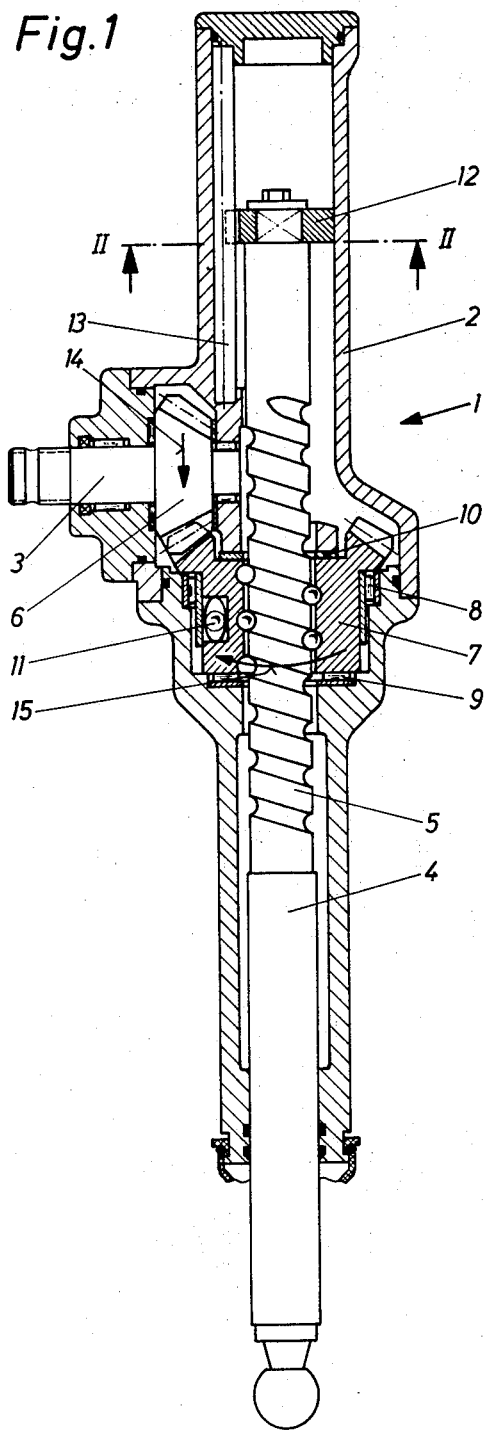
FIG. 1 is a longitudinal cross-section of the invention illustrating gearing comprising bevel gears carried by a housing for rotating a ball nut which reciprocates the actuator rod.
Figure 2:
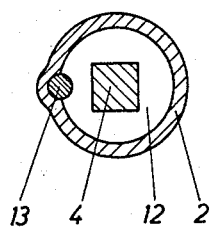
FIG. 2 is a section through II—II of FIG. 1.

Referring to FIGS. 1 and 2, the invention comprises the steering device 1 having a housing 2 of elongated shape made of two sections suitably joined at their open ends as by welding or bolting (not shown) and comprising a chamber at right angles to the axis of the housing for holding a bevel gear 6 and an axial chamber for holding a ball nut 7 having at one end a second bevelgear which is integral and coaxial with the ball nut.

The first bevel gear 6 has a manually rotative steering spindle 3 and it will be understood that the exterior end of the spindle is to be connected to a shaft within a steering column for manual rotation of the spindle and bevel gear 6, such rotation of bevelgear 6, which is supported by the housing in mesh with the second bevel gear on the ball nut 7, effects rotation of the ball nut.

Passing through the ball nut is an actuator rod 4 having worm thread 5 which coacts with the ball thread 11 so that rotation of the ball nut can effect linear reciprocation in a respective direction of the actuator rod. The rod is maintained against rotation by a fixed rod or rail 13 carried within the upper end of the housing at one side thereof which rail fits within a groove in a member 12 carried on a squared end of rod 4 at the upper end of the actuator rod. Thus it will be apparent that the actuator rod can move up or down with respect to FIG. 1 but due to the slidable keying effect of rail 13 is restricted from rotation.

The exterior end of the actuator rod can be formed with a ball as shown so as to connect with a ball joint formation with the steering linkages of a vehicle.

The first bevel gear 6 has suitable radial bearings in the end cap of its chamber as well as in the wall of the housing, as will be readily apparent, being thus supported on both sides via the spindle 3 and the coaxial stub shaft disposed within the wall of the housing via the bearing shown.

The ball nut 7 is supported against axial thrust on a shoulder diametric with its chamber, having a thrust bearing 9 between the end of the ball nut and the shoulder. Radial bearing support is provided by the bearing 8 encompassing the ball nut intermediate the ball nut and the housing wall, i.e., the holding chamber for the ball nut. A further axial thrust bearing 10 is provided at the bevel gear end of the ball nut intermediate that end and a transverse support wall which is formed as an integral part of the upper section of the housing.

Thus it will be apparent that rotation of spindle 3 in the direction of the arrow 14 will produce rotation of ball nut 7 in the direction of the arrow 15. This will drive the actuator rod 4 downwardly with linear movement only. Reverse rotation of spindle 3 will, of course, drive the actuator rod upwardly. Accordingly, steering left or right for the vehicle is effected. It will be obvious that either a right hand or a left hand thread can be used for the thread 5, depending upon the design of the steering linkages for any particular vehicle.

Figure 5:
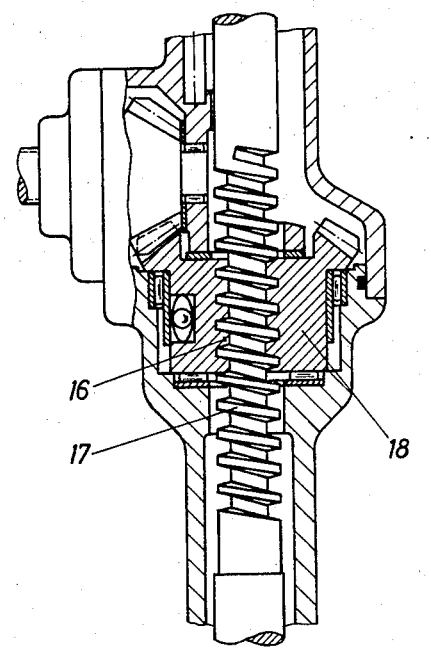
FIG. 5 is a fragmentary longitudinal section essentially the same as FIG. 1 in the components shown but modified to use a high-pitch worm and thread between the actuator rod and the driving rod.

Likewise, at this time referring to FIG. 5, all components are the same as in FIG. 1, except that instead of a ball nut a high-pitch, male and female thread arrangement is used. Thus the nut has a female thread 16 while a male thread 17 is used on the actuator rod.

Figure 3:
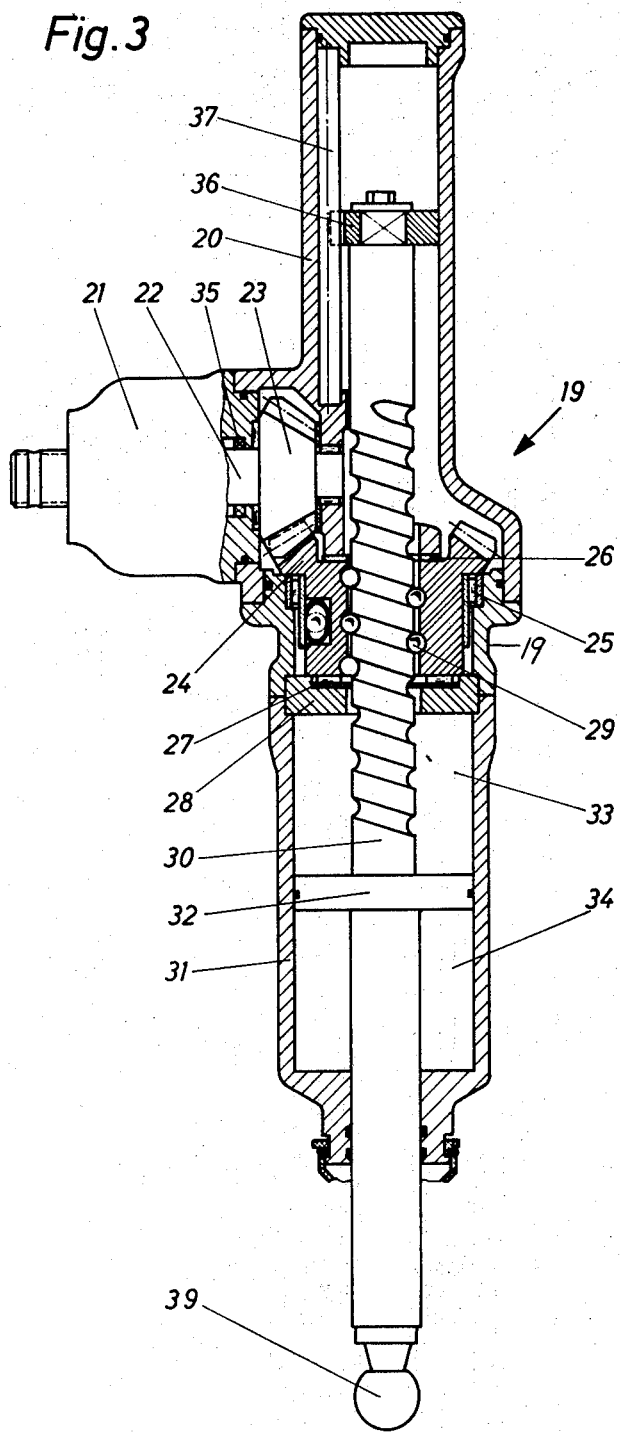
FIG. 3 is another longitudinal cross-section of essentially the same construction but modified to add a double acting booster pressure cylinder for driving the actuator rod.

Reference is now made to FIG. 3 showing an embodiment essentially the same in mechanical action as heretofore described. Thus the steering device 19 has a first bevel gear 23 and a ball not with second bevel gear 24 for manual actuation of an actuator rod 30. The rod is maintained against rotation by the rail 37 in the housing section 20 and the grooved guide member 36.

The first bevel gear is suitably supported by bearings in a chamber of the housing section 20 retained by an end cap 21, with the manually operable spindle 22 integral with the gear. The second bevel gear has thrust support on a transverse separate plate 28 clamped between the sections of the housing 19 and 31 whereby axial support for the force effect of the ball nut arrangement 29 is afforded via bearing 27 on the member 28.

The ball nut is provided peripherally with the radial bearing 28, both being in the chamber effected by the housing section 19 secured intermediate housing sections 20 and 31.

The housing sections may be welded or bolted or otherwise secured to each other and the housing section 31 is actually a double acting cylinder for booster power pressure. This is readily achieved by providing a booster piston 32 on an unthreaded portion of the actuator rod 30, which piston divides the housing section 31 into the pressure chambers 33 and 34. It will be apparent that any conventional hydraulic circuitry can be utilized to pressurize one chamber while exhausting the other chamber in order to linearly reciprocate the actuator rod, which has the ball joint 39 at one end for convenient connection to a steering linkage.

It will be noted that the upper end of the housing is sealingly closed and that it is exposed to pressure in chamber 33 which has access thereto through the ball nut and around the ball nut. This effects automatic lubrication. However, in order to prevent loss of pressure out of the housing a sealing ring 35 is provided around the spindle 22 and within the cap 21. Thus the entire gearing mechanism and ball nut are maintained lubricated by the pressure fluid, sealed within the housing.

Figure 4:
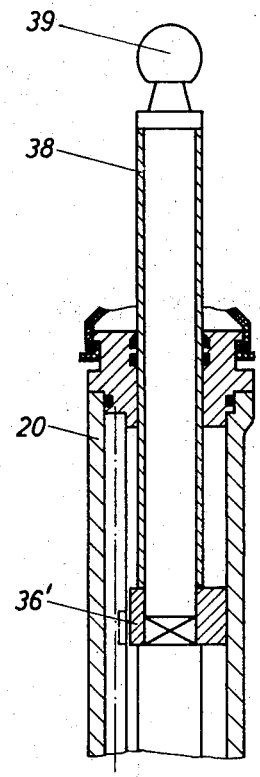
FIG. 4 is a further modification of the upper end of FIG. 3 showing the actuator rod extended so as to protrude from the upper end of the housing.

Attention is invited to FIG. 4 which is a construction that may be used to modify the other constructions disclosed herein. Thus in FIG. 4, the actuator rod 38 with ball connection end 39 can extend through both ends of a housing, the upper section 20 of which being shown since it can conform exactly to that shown in FIG. 3. In this instance the connecting rod is preferably formed with a sealing sleeve to reciprocate within suitable seals of an end cap as shown in FIG. 4 and which can rest on the grooved guide member 36′, being locked between that member and the diametrically extended flange of the ball joint. It will also be apparent that such double-ended actuator rod can also be applied to the construction of FIGS. 1 and 5.

From the above description it will be apparent that the invention can provide for any necessary degree of mechanical advantage by changing the gear ratio of the bevel gears as well as the pitch of the thread or groove on the actuator rod.

Accordingly, the invention is usable by itself without the pressure booster effect of FIG. 3 or in conjunction with the pressure booster effect so that in the event of failure of pressure, the vehicle can still be steered by manual force. This is a very important factor inasmuch as vehicle law in certain countries requires that booster steering mechanisms be manually steerable in the event of failure of pressure. Further, it can readily be seen that the invention is easily adaptable to all types of steering linkages by virtue of the ease with which the actuator rod can extend through either or both ends of the housing.

What is claimed is:

1. A steering device comprising a first bevel gear and a steering spindle secured thereto for manual rotation thereof;
   - a second bevel gear supported in mesh with said first bevel gear for rotation thereby and of larger diameter so as to effect a predetermined mechanical advantage ratio;
   - a nut secured to said second bevel gear and rotative therewith;
   - a steering actuator rod passing through said nut and means whereby said rod is supported to be reciprocally and non-rotatively movable;
   - a thread engagement means intermediate said nut and rod whereby rotation of said nut in either direction effects linear movement of said rod in a respective direction;
   - rotation of said steering spindle thus effecting movement of said rod to achieve a vehicle steering force;

and housing means comprising a first and second elongated housing sections joined in axial relationship with a third housing section therebetween; a thrust support wall extending transversely across the plane of juncture of said second and third housing sections; said first housing section having a chamber for housing and supporting said first bevel gear with the rotational axis thereof normal to the axis of said other housing sections; said third housing section and transverse wall effecting a chamber for housing and supporting said nut whereby said second bevel gear is supported in mesh engagement with said first bevel gear.

2. A hydraulic steering device comprising a first bevel gear and a steering spindle secured thereto for manual rotation thereof;
   - a second bevel gear supported in mesh with said first bevel gear for rotation thereby and of larger diameter so as to effect a predetermined mechanical advantage rotio;
   - a nut secured to said second bevel gear and rotative therewith;
   - a steering actuator rod passing through said nut and means whereby said rod is supported to be reciprocally and non-rotatively movable;
   - a thread engagement means intermediate said nut and rod whereby rotation of said nut in either direction effects linear movement of said rod in a respective direction;
   - rotation of said steering spindle thus effecting manual effort movement of said rod to achieve a vehicle steering force; a housing, and said rod extending sealingly into said housing, said rod being adapted for connection to a steering mechanism; means sealing said housing for holding pressure fluid; a piston on said rod, and said housing and said piston effecting a double acting pressure cylinder to drive said rod by fluid pressure in one direction and the opposite direction for steering a vehicle independently of manual effort.

3. A hydraulic steering device comprising a first bevel gear and a steering spindle secured thereto for manual rotation thereof;
   - a second bevel gear supported in mesh with said first bevel gear for rotation thereby and of larger diameter so as to effect a predetermined mechanical advantage ratio;
   - a nut secured to said second bevel gear and rotative therewith;
   - a steering actuator rod passing through said nut and means whereby said rod is supported to be reciprocally and non-rotatively movable;
   - a thread engagement means intermediate said nut and rod whereby rotation of said nut in either direction effects linear movement of said rod in a respective direction;
   - rotation of said steering spindle thus effecting movement of said rod to achieve a vehicle steering force by manual effort, including a housing and said actuator rod having a portion slidably movable therein; a piston on said actuator rod and said housing effecting a pressure fluid chamber means for driving said piston; said housing effecting support of said gears and said pressure chamber means having flow communication for pressure fluid access to said gears and nut for lubrication thereof, wherein said piston can effect movement of said rod under fluid pressure independently of manual effort.

4. A hydraulic steering device comprising a first bevel gear and a steering spindle secured thereto for manual rotation thereof;
   - a second bevel gear supported in mesh with said first bevel gear for rotation thereby and of larger diameter so as to effect a predetermined mechanical advantage ratio;
   - a nut secured to said second bevel gear and rotative therewith;

a steering actuator rod passing through said nut and means whereby said rod is supported to be reciprocally and non-rotatively movable;

a thread engagement means intermediate said nut and rod whereby rotation of said nut in either direction effect linear movement of said rod in a respective direction;

rotation of said steering spindle thus effecting movement of said rod to achieve a vehicle steering force;

and a housing having a first chamber for housing and supporting said first bevel gear; said housing having a second chamber for housing and supporting said nut whereby said second bevel gear is supported in mesh engagement with said first bevel gear; said housing having a fluid pressure cylinder portion and said actuator rod having a piston therein dividing said housing portion into pressure chambers for driving said piston by hydraulic fluid, one said pressure chamber being between said piston and said nut and means effecting flow communication of hydraulic fluid therefrom to said nut and bevel gears for lubrication thereof.

5. A steering device comprising a first bevel gear and a steering spindle secured thereto for manual rotation thereof;

a second bevel gear supported in mesh with said first bevel gear for rotation thereby and of larger diameter so as to effect a predetermined mechanical advantage ratio;

a nut secured to said second bevel gear and rotative therewith;

a steering actuator rod passing through said nut and means whereby said rod is supported to be reciprocally and non-rotatively movable;

a thread engagement means intermediate said nut and rod whereby rotation of said nut in either direction effects linear movement of said rod in a respective direction;

rotation of said steering spindle thus effecting movement of said rod to achieve a vehicle steering force;

including an elongated housing having a central portion accommodating said gears and nut and having ends extending therefrom in opposite directions;

said rod having an end extending into one of said housing ends and having a grooved member, said one housing end having a rail coacting with said grooved member whereby said rod is non-rotative;

said rod being reciprocally sealed in said one end;

the other end of said rod extending exteriorly through the other end of said housing and emerging therefrom with a seal in said other end of said housing sealing said other rod;

said other rod end being free for connection to a steering mechanism.

\* \* \* \* \*